United States Patent [19]

Borgmann

[11] Patent Number: 4,644,856
[45] Date of Patent: Feb. 24, 1987

[54] APPARATUS FOR BREWING ESPRESSO COFFEE

[75] Inventor: Michael Borgmann, Solingen, Fed. Rep. of Germany

[73] Assignee: Robert Krups Stiftung & Co. KG., Solingen, Fed. Rep. of Germany

[21] Appl. No.: 689,844

[22] Filed: Jan. 9, 1985

[30] Foreign Application Priority Data

Jan. 10, 1984 [DE] Fed. Rep. of Germany ........ 3400567

[51] Int. Cl.⁴ .............................................. A47J 31/34
[52] U.S. Cl. ........................................ 99/295; 99/294; 210/455; 210/481
[58] Field of Search ................. 99/295, 287, 293, 294, 99/302 R, 323, 279; 210/455, 481; 426/433

[56] References Cited

U.S. PATENT DOCUMENTS 3,599,557  8/1971  Leal .................................. 99/302 R

FOREIGN PATENT DOCUMENTS 440854  2/1927  Fed. Rep. of Germany ........ 99/294
514118  11/1930  Fed. Rep. of Germany ........ 99/294
267502  9/1929  Italy .................................... 99/294

*Primary Examiner*—Robert W. Jenkins
*Attorney, Agent, or Firm*—Peter K. Kontler

[57] ABSTRACT

The holder for a filter which contains a supply of comminuted coffee beans in an espresso coffee brewing apparatus is separably connectable to the housing of the apparatus by a bayonet lock connection and is separably connected with the filter by a coupling or detent of the type having cooperating male and female elements with the male elements provided on the holder and the female elements provided on the filter or vice versa. The filter is provided with arms for retaining the remnants of the supply of comminuted coffee beans therein.

8 Claims, 6 Drawing Figures

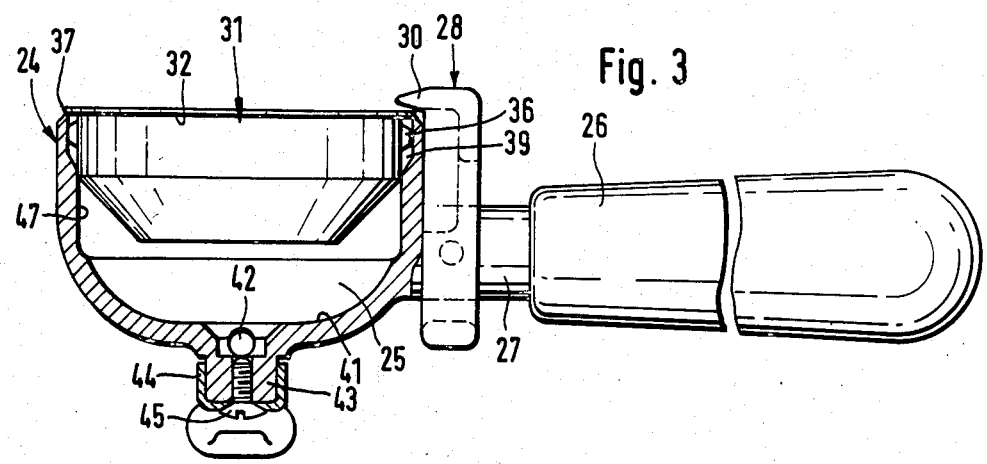
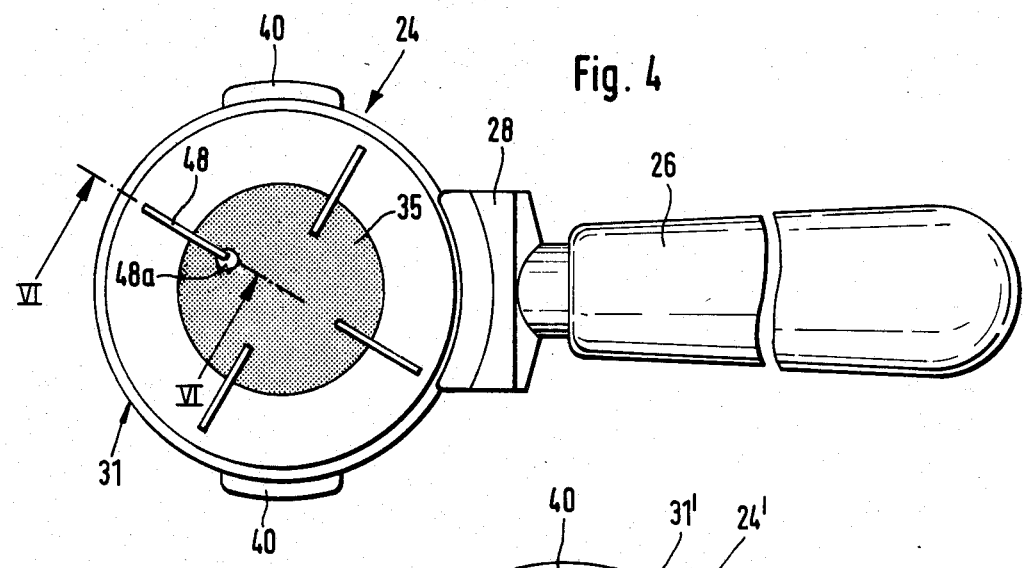
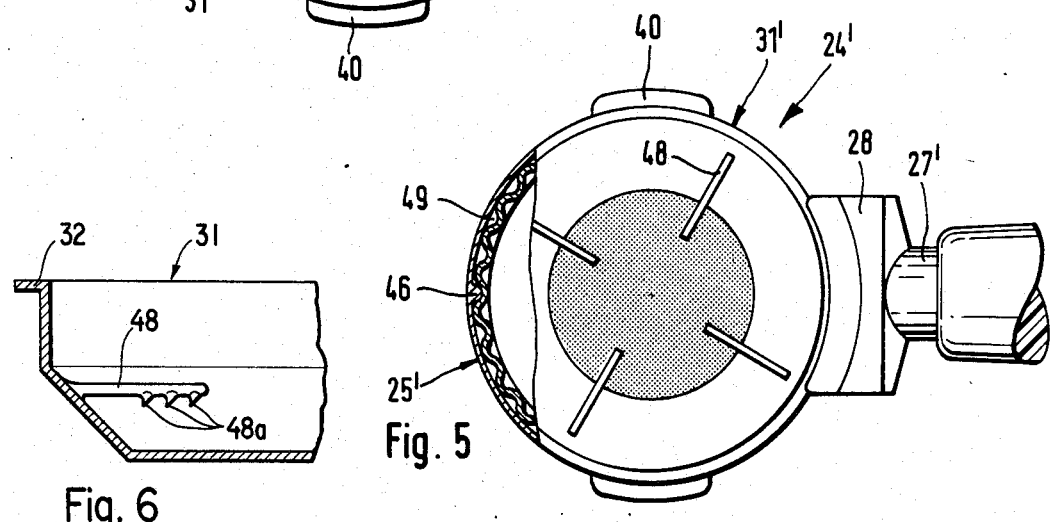
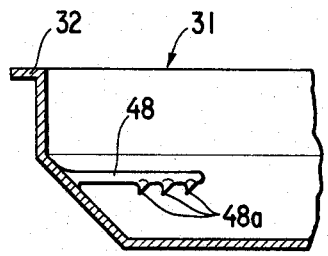

APPARATUS FOR BREWING ESPRESSO COFFEE

BACKGROUND OF THE INVENTION

The present invention relates to coffee brewing apparatus in general and more particularly to improvements in apparatus for brewing espresso or capuccino coffee. Still more particularly, the invention relates to improvements in electrically operated espresso coffee brewing apparatus of the type wherein a holder for a sieve or filter containing a supply of powdered coffee beans is detachably connected to a support in or on a housing which contains or carries a supply of fresh water, means for heating the water and means for forcing heated water through the supply of comminuted coffee beans.

Apparatus of the above outlined character are known in a variety of sizes and shapes. They share the feature that the holder for the filter which contains a supply of comminuted coffee beans is detachably secured to the housing, for example, by a bayonet lock or by another suitable quick-release connection. The filter is separably received in the holder so that each of these parts can be independently cleaned as well as that the holder can accept smaller or larger filters.

Many presently known apparatus of the above outlined character exhibit the drawback that the filter is not readily separable from the support for the holder. The situation is aggravated if the holder is not detached from its support immediately or shortly after use. It has been found that the filter exhibits a tendency to adhere to the support, i.e., to become detached from the holder while the latter is being separated from its support. In many instances, the support carries a ring-shaped seal which is engaged by and to which the filter adheres with a force which is sufficiently pronounced to cause separation of the holder from the filter even though the filter should be detached jointly with the holder.

Attempts to prevent adherence of the filter to the support in an espresso coffee brewing apparatus include the provision of means for separably securing the filter to its carrier so that the filter is compelled to share the movements of the carrier with reference to the support. In accordance with one presently known proposal, the securing means comprises a magnet which is mounted at the inner side of the holder and attracts the filter so that the latter becomes separated from the support for the holder in the brewing apparatus. Such securing means exhibit a number of drawbacks. Thus, it is rather difficult to properly install one or more magnets at the inner side of the holder. Secondly, a magnet can attract the filter only if the latter consists at least in part of a ferromagnetic material which contributes to the cost of the filter and reduces the number of materials which can be used for the making of filters. Moreover, the force with which a relatively small magnet attracts the filter is rather small so that the magnet cannot ensure predictable separation of the filter from the support for the holder.

OBJECTS AND SUMMARY OF THE INVENTION

An object of the invention is to provide an apparatus for brewing espresso coffee wherein the filter or sieve can be separably but reliably affixed to its holder in a novel and improved way.

Another object of the invention is to provide a novel and improved filter holder for use in espresso coffee brewing apparatus.

A further object of the invention is to provide a novel and improved filter or sieve for use in an apparatus of the above outlined character.

An additional object of the invention is to provide a novel and improved holder-filter combination for use in apparatus for brewing espresso coffee.

Still another object of the invention is to provide a simple, compact and inexpensive but rugged and reliable holder-filter combination for use in the above outlined apparatus which need not be equipped with one or more magnets and which reliably ensures that the filter will share all movements of the holder with reference to the housing of the brewing apparatus.

The invention is embodied in an apparatus for brewing espresso or capuccino coffee, preferably in an apparatus wherein water is electrically heated to generate steam which is caused to pass through a supply of comminuted coffee beans. The apparatus comprises a support which preferably constitutes or forms part of the housing of the brewing apparatus, a manually operable holder which is preferably provided with a handle carrying a first cupped member, a bayonet lock or other suitable means for separably connecting the holder to the support, a filter which serves to receive the aforementioned supply of comminuted coffee beans and preferably comprises a second cupped member receivable in the first cupped member, and means for separably coupling the second cupped member to the first cupped member. The coupling means preferably comprises complementary male and female coupling components one of which is provided on the holder and the other of which is provided on the filter. In accordance with a first embodiment of the invention, the male component is provided on the filter and the female component is provided on the holder. The first cupped member has an internal surface which is adjacent to its open end and which is then provided with an annulus of preferably equidistant sockets constituting the female coupling component, and the second cupped member has an external surface disposed in the region of its open end and carrying preferably two male coupling elements which are disposed diametrically opposite each other with reference to the axis of the second cupped member and are receivable in two discrete sockets of the first cupped member. The sockets of the female coupling component preferably form several pairs of sockets disposed diametrically opposite each other, and the male coupling elements can be received in any selected pair of such sockets.

Alternatively, the male coupling component can include a pair of male coupling elements extending inwardly from the internal surface of the first cupped member and the female component of the coupling means then comprises an annulus of equidistant sockets provided in the external surface of the second cupped member and each arranged to receive a discrete male coupling element when the second cupped member is properly inserted into the first cupped member before the holder is separably secured to its support.

The filter can further comprise means for retaining the supply of comminuted (e.g., powdered) coffee beans in the second cupped member. Such retaining means can comprise at least one retaining member which can be provided with one or more substantially hook-shaped retaining portions and extends into the second cupped member. In accordance with a presently preferred embodiment of the invention, the filter comprises several (e.g., four) retaining members which are equidistant from each other, as considered in the circumferential direction of the second cupped member.

The novel features which are considered as characteristic of the invention are set forth in particular in the appended claims. The improved coffee brewing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 illustrates the structure of FIG. 2 but with the filter inserted into and releasably coupled to the holder, the filter-receiving cupped member of the holder being shown in a central vertical sectional view;

FIG. 4 is a plan view of the structure which shown in FIG. 3;

FIG. 5 illustrates a portion of a modified holder and a modified filter, with parts of the holder and filter broken away to reveal a modified separable coupling between such parts of the coffee brewing apparatus; and FIG. 6 is a fragmentary sectional view as seen in the direction of arrows from the line VI—VI of FIG. 4.

DESCRIPTION OF THE PREFERRED EMBODIMENTS

Figure 1:
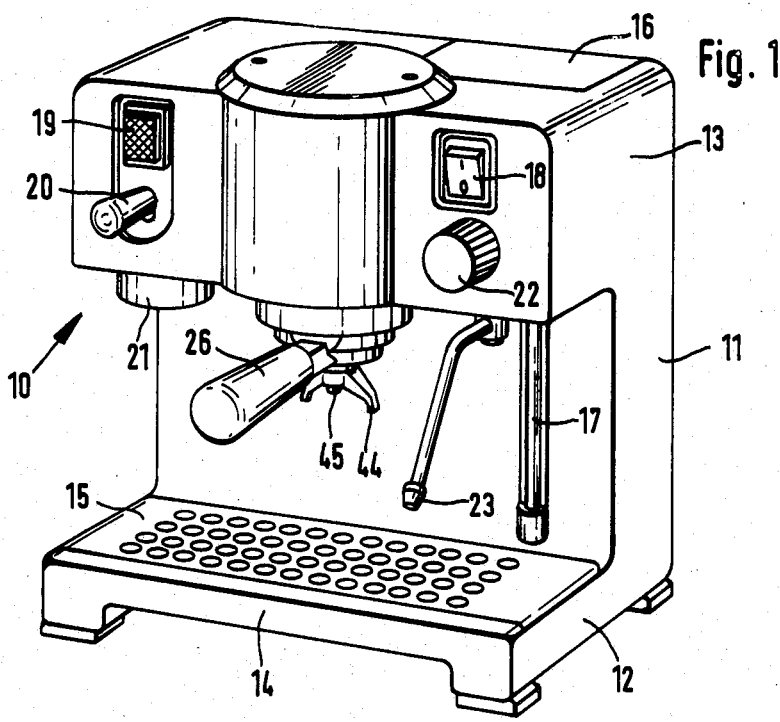
FIG. 1 is a perspective view of an espresso coffee brewing apparatus which embodies one form of the present invention and wherein the holder for the filter is shown in its operative position in which it is separably attached to the housing of the apparatus.

FIG. 1 is a perspective view of an espresso or capuccino coffee brewing apparatus 10 which can embody the present invention. Only those parts of the apparatus are shown which contribute to better understanding of the invention. For example, FIG. 1 does not show the electric cord which connects the electrically operated parts (including the water heater, the water pump and various signal generating components) with a suitable source of electrical energy. The apparatus includes a housing including an upright portion 11 carrying a relatively large flat base 12 with four legs which can be placed onto a kitchen table, onto a shelf or onto any other suitable support for the improved apparatus. The upper part of the housing portion 11 is rigid or integral with a support 13 which is spaced apart from and is disposed at a level above the base 12. The base 12 is hollow and contains a tray which is disposed behind its front wall 14 and is overlapped by a perforated cover plate 15 serving as a platform for one or more cups and also as a means for permitting spilled coffee or other liquids to enter the aforementioned tray. The cover plate 15 can be pivoted relative to or lifted off the base 12 so as to afford access to the tray for periodic evacuation of its contents and/or for cleaning.

The top wall of the upper portion or support 13 of the housing is provided with a flap 16 which is shown in closed position but can be pivoted to an open position in which it affords access to an elongated upright water tank (not shown) including an elongated upright tubular water level indicator 17. The tank can be extracted from the housing for refilling with fresh water or the lid 16 is simply pivoted to open position and the tank is refilled by way of a flexible hose or by resorting to a large cup, pot or a like water pouring device. As a rule, the upper end portion of the water tank below the flap 16 is provided with a pivotable handle which facilitates extraction of the tank from the housing 11-13 and its manipulation during filling with water from a faucet or another suitable source. The front wall of the upright housing portion 11 has a suitable slot for the water level indicator 17 so that the latter can be withdrawn and reinserted together with the tank.

The front wall of the upper portion or support 13 of the housing of the apparatus 10 carries an on-off switch 18 which can complete or interrupt the electric circuit of the apparatus and is installed at a level above a rotary knob-shaped steam regulator 22. The latter can be rotated between a first end position and a second end position as well as to a practically infinite number of intermediate positions. The regulator 22 can admit selected quantities of steam into a nozzle 23 which projects downwardly from the bottom wall of the support 13 and can be used as a means for preheating a cup prior to introduction of espresso coffee thereinto. The nozzle 23 is preferably pivotable relative to the support 13 so that it can be moved out of the way when one or more preheated cups are ready to receive freshly brewed coffee.

The front wall of the support 13 further carries a signal generating device 19 which is mounted at the level of the switch 18 and generates a readily detectable (e.g., visible) signal when the temperature of water in the apparatus 10 has risen or is yet to rise to a predetermined value. For example, the device 19 can light up as soon as the switch 18 is turned on, and its signal disappears when the temperature of heated water is sufficiently high to allow for the brewing of satisfactory espresso coffee. An espresso coffee metering lever 20 is pivotably and/or shiftably mounted on the front wall of the support 13 at a level below the signal generating device 19. The lever 20 is actuated by the operator of the apparatus 10 to admit a selected quantity of freshly brewed coffee into a single cup or into two discrete cups on the perforated cover plate 15.

The bottom wall of the support 13 carries a tamping device 21 for a supply of comminuted (e.g., pulverized) coffee beans in a filter 31 (FIG. 2) which is insertable into a holder 24 and can be releasably held in the holder 24 in accordance with a feature of the present invention. The illustrated tamping device 21 is a substantially cylindrical protuberance which extends downwardly from the bottom wall of the support 13 at a level below the metering lever 20.

The holder 24 can be separably connected to the bottom wall of the support 13 by a bayonet lock including two male portions in the form of wedge-like cams 40 provided on the external surface of a cupped member 25 which forms part of the holder 24. The cupped member 25 is made of steel or another suitable metallic material and has a shank 27 extending into an elongated handle 26 which is a poor conductor of heat so that it can be readily grasped by hand even if the cupped member 25 is heated to an elevated temperature. The cams 40 are receivable in complementary cam slots provided in or above the bottom wall of the support 13. The arrangement is such that the handle 26 must be turned clockwise or counterclockwise from the position which is shown in FIG. 1 in order to allow for separation of the cupped member 25 from the support 13, and back to the position of FIG. 1 in order to ensure that the bayonet lock including the cams 40 detachably secures the holder 24 to the housing 11-13 of the brewing apparatus 10. The shank 27 of the cupped member 25 supports a pivotable clamping member 28 having two coaxial stubs 29 which are received in complementary blind bores of the shank 27 and a pallet 30 which can overlie the ledge-like marginal portion 32 of the filter 31 when the latter is properly inserted into the cupped member 25 of the holder 24. The lower portion of the clamping member 28 is slotted and the material of this clamping member is preferably at least slightly elastic so that it can be slipped onto and detached from the shank 27. A spring (not shown) can be provided to bias the clamping member 28 to the inoperative position of FIG. 2 or to an operative position in which the pallet 30 overlies the adjacent part of the marginal portion 32 of the filter 31. The clamping member 28 is preferably made of a synthetic plastic material which is a poor conductor of heat so that this member can be pivoted by hand even if the cupped member 25 is heated to an elevated temperature. The direction in which the cupped member 33-35 below the marginal portion 32 of the filter 31 can be inserted into the cupped member 25 of the handle 24 is indicated by the arrow A. When the cupped member 33-35 of the filter 31 is properly inserted into the cupped member 25 of the handle 24, and the pallet 30 overlies the adjacent part of the marginal portion 32 of the filter, the assembly of parts 24, 31 can be turned upside down and knocked or tapped against a hard object, e.g., against the surface of a sink, so as to expel the dregs from the interior of the filter 31 prior to introduction of a fresh supply of comminuted coffee beans.

The aforementioned bayonet lock including the cams 40 on the cupped member 25 of the holder 24 and the complementary cam slots on the support 13 of the housing 11-13 of the brewing apparatus 10 can be replaced with other suitable means for separably connecting the cupped member to the brewing unit of the apparatus. As mentioned above, the handle 26 assumes the position of FIG. 1 when the holder 24 (and the filter 31 in the cupped member 25) is properly secured to the support 13 in register with the brewing unit. Connecting means in the form of bayonet locks for separably securing the holder of a filter to the housing of an espresso coffee brewing apparatus are well known in the art.

Figure 2:
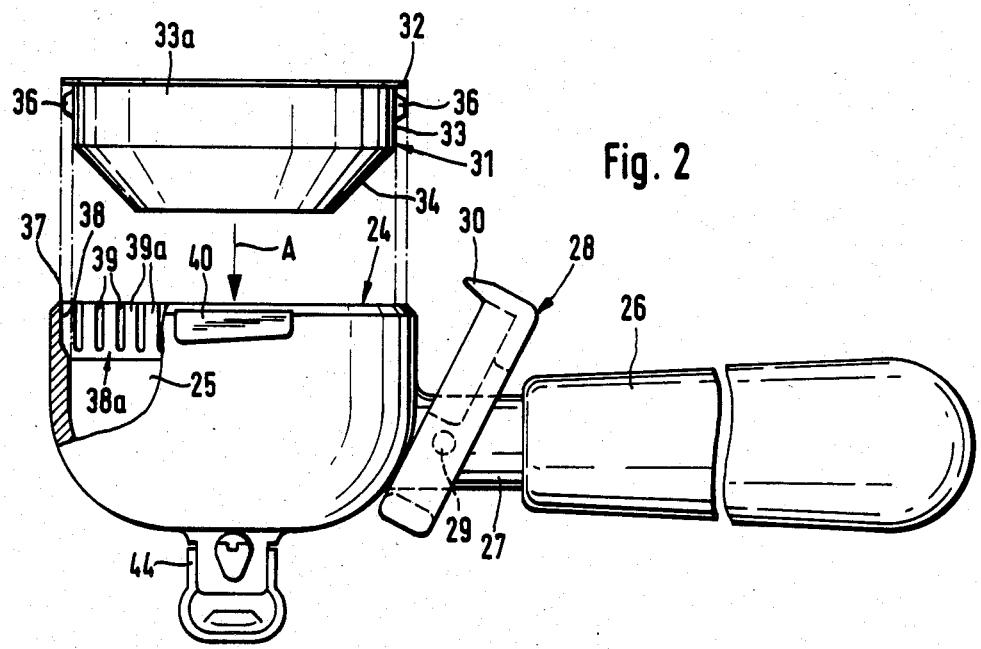
FIG. 2 is an enlarged side elevational view of the holder and of the filter, the latter being shown at a level above the holder and a portion of the holder being broken away so as to show the female coupling component at the inner side of its cupped member.

As can be seen in FIG. 2, the cupped member 25 of the holder 24 has a ring-shaped end face 37 which surrounds the open end of the member 25 and is designed to serve as a rest for the underside of the marginal portion 32. The end face 37 is provided on a ring-shaped portion 38 of the cupped member 25 and the internal surface 38a of the portion 38 is formed with an annulus of equidistant parallel sockets in the form of elongated slots 39, each of which terminates in the end face 37. That portion of the cupped member 25 which defines the sockets or slots 39 constitutes a female coupling component which can cooperate with a male coupling component on the cupped member 33-35 of the filter 31 to separably couple the filter to the holder 24 so that the provision of the clamping device 28 can constitute an optional (extra safety) feature because, as a rule, the filter 31 will be held in the cupped member 25 as soon as the female component of the coupling means is properly engaged by the male component. The cupped member 33-35 of the filter 31 comprises a cylindrical portion 33 which carries the marginal portion 32 and a frustoconical portion 34 which is separated from the marginal portion by the cylindrical portion 33 and has a perforated bottom wall 35 (see FIG. 4) which retains the comminuted coffee beans but permits coffee to penetrate therethrough and to flow into the cupped member 25 of the holder 24. The male coupling component includes two male coupling elements 36 in the form of round or elongated protuberances extending outwardly from the external surface 33a of the cylindrical portion 33 of the cupped member of the filter 31 and being receivable in any one of several pairs of sockets 39 of the female coupling component in the member 25. The male coupling elements 36 are disposed diametrically opposite each other with reference to the axis of the filter 31, and they can be received in any one of those pairs of sockets 39 which are disposed diametrically opposite each other with reference to the axis of the cupped member 25. The male coupling elements 36 can be formed by simply deforming the corresponding parts of the cylindrical portion 33, i.e., by forcing some of the material of the portion 33 radially outwardly during the making of the filter 31. The latter preferably consists of a suitable metallic material.

As can be best seen in FIG. 3, the central portion of the bottom wall 41 of the cupped member 25 which forms part of the filter holder 24 has an outlet 42 for the flow of espresso coffee into one or more cups on the perforated cover plate 15. FIG. 3 further shows that the central portion of the bottom wall 41 has a downwardly extending cylindrical or substantially cylindrical nipple 43 with two bores disposed diametrically opposite each other and communicating with the outlet 42. The nipple 43 supports a trough-shaped sheet metal or synthetic plastic distributor 44 which is separably secured thereto by a screw 45 or another suitable fastener and has two outlets each of which communicates with one of the two bores in the nipple 43. This renders it possible to simultaneously admit coffee into two discrete cups on the cover plate 15 or to locate a single cup in such position that it receives coffee from both outlets of the distributor 44.

FIG. 4 shows that the filter 31 can be provided with means for retaining the supply of comminuted coffee beans on the bottom wall 35 of the filter 31. In the illustrated embodiment, the retaining means comprises four equidistant radially disposed retaining members 48 each of which extends into the cupped member 33-35 of the filter 31 and each of which can be provided with a claw-shaped portion 48a which rests on the supply of coffee in the filter 31. Each of the four illustrated retaining members 48 may constitute an elongated arm which is permanently affixed to the cupped member of the filter 31 and such arms are equidistant from one another, as considered in the circumferential direction of the filter 31. The retaining members or arms 48 can constitute integral parts of the filter 31 (i.e., they can be produced simultaneously with the cupped member 33-35 or the filter) or they may be produced separately and permanently or separably attached to the cupped member of the filter in a separate step. The main purpose of the retaining members 48 is to ensure that the dregs of comminuted coffee beans are invariably detached from the brewing unit of the apparatus 10 when the holder 24 is detached from the bottom wall of the support 13.

The purpose of the claw-shaped portions 48a is to increase the area of contact between the comminuted coffee beans in the filter 31 and the retaining members 48. Each of the retaining members 48 can carry two or more claw-shaped portions 48a or otherwise configurated portions which serve the same purpose, i.e., to increase the area of contact with the supply of comminuted coffee beans on the foraminous bottom wall 35 of the filter 31.

The mode of operation of the brewing apparatus 10 is as follows:

The tank in the housing portion below the flap 16 is assumed to contain a supply of fresh water. The plug on the electric cord is inserted into a household outlet and the operator actuates the switch 18 to start the brewing unit. The device 19 immediately generates a visible signal which indicates that the temperature of water is below that which is acceptable for the brewing of satisfactory espresso coffee. The signal which is generated by the device 19 disappears when the water reaches the prescribed optimum temperature. The apparatus 10 can be furnished with a set of two or more different filters 31, namely with filters each of which can receive and retain a different quantity of comminuted coffee beans. As shown in FIG. 3, the space 47 in the cupped member 25 is dimensioned in such a way that it can receive a small, a medium sized or a large filter. The male coupling elements 36 of the filter 31 penetrate into the selected sockets 39 and engage the ribs 39a, which separate the sockets 39 from each other, with a reasonable force to thus ensure that the selected filter 31 is adequately retained in the cupped member 25 of the holder 24. The operator can use a measuring spoon or a like metering device to ensure that the filter 31 which has been inserted into and is held in the cupped member 25 of the holder 24 receives an optimum quantity of pulverized coffee beans. As a rule, the apparatus 10 is or can be furnished with a suitable grinder which can reduce coffee beans to particles of desired consistency such as is best suited to ensure the making of acceptable espresso or capuccino coffee. The wedge-like cams 40 of the cupped member 25 are then engaged with the complementary parts of the bayonet lock on the bottom wall of the support 13 so that the holder 24 is safely secured to the brewing unit whereby the handle 26 extends forwardly (as shown in FIG. 1) as soon as the attachment of the holder 24 to the bottom wall of the support 13 is completed.

In the next step, the operator places one or more cups onto the perforated cover plate 15 so that a single cup can receive coffee from both outlets of the distributor 44 or that each of two cups can receive coffee from one of these outlets. When the signal which is generated by the device 19 disappears, the operator can cause steam to pass through the supply of coffee beans in the filter 31 by the simple expedient of actuating the lever 20. This lever can be used to determine the quantity of coffee in each cup as well as the strength of the coffee if the latter is to be served with cream or milk.

FIG. 5 shows a modified holder 24' and a modified filter 31'. The main difference between the embodiments of FIGS. 1-4 and FIG. 5 is that the male coupling component of the second embodiment is provided at the internal surface surrounding the open end of the cupped member 25' and the female coupling component is provided at the external surface surrounding the open end of the cupped member of the filter 31'. The manner in which the cupped member 25' can be separably secured to the bottom wall of the support 13 by a bayonet lock including the cams 40 shown in FIG. 5 is the same as described above in connection with the embodiment of FIGS. 1 to 4. The same holds true for the mounting and purpose of the clamping device 28 on the shank 27' of the cupped member 25'. The internal surface of the cupped member 25' is provided with two male coupling elements 46 (only one can be seen in FIG. 5) which are preferably disposed diametrically opposite each other and can enter a pair of registering sockets 49 in the external surface of the cupped member of the filter 31'. The external surface of such cupped member of the filter 31' can be formed with an annulus of equidistant sockets 49. Such annulus includes several pairs of sockets 49 which are disposed diametrically opposite each other so that any one of these pairs can receive the male coupling elements 46 of the cupped member 25'. In all other respects, the construction of the holder 24' and filter 31' can be identical with the construction of the similarly referenced parts shown in FIGS. 2 to 4.

The improved apparatus is susceptible of many further modifications without departing from the spirit of the invention. Thus, the two illustrated coupling means can be replaced with other types of coupling means which releasably but securely hold the filter 31 or 31' in the cupped member 25 or 25' to thus ensure that the filter is invariably detached from the support 13 in response to detachment of the respective holder 24 or 24'. For example, the number of male coupling elements can be increased to three or more or reduced to a single coupling element, and the upper ends of the sockets 39 or 49 need not be open if the male coupling element or elements can yield during insertion of the filter into the cupped member 25 or 25'. Still further, the improved coupling means can be used in other types of espresso coffee brewing apparatus, e.g., in apparatus wherein the holder for the filter need not be secured to the central portion of the bottom wall of a support which constitutes the uppermost part of the housing.

Friction between the male and female components of the improved coupling means is sufficiently pronounced to ensure that the filter 31 or 31' shares the movements of the holder 24 or 24' relative to the support for the holder even if the holder remains attached to its support for an extended interval of time following the making of the last cup of coffee. Separation of the filter from the cupped member of the holder presents no problems; all that is necessary is to exert finger pressure against the marginal portion 32 so as to expel the male coupling elements 36 or 46 from the corresponding sockets 39 or 49 or to use a rudimentary tool, such as a spoon. It has been found that the establishment of form-locking connections between a small number of male coupling elements and the surfaces surrounding the respective sockets 39 or 49 suffices to ensure that the filter shares all movements of its holder unless the operator desires to separate the filter, e.g., in order to replace it with a different filter or for the purpose of cleaning. Form-locking connections between a pair of male coupling elements and the adjacent surfaces of the female coupling component can resist very pronounced separating forces so that the likelihood of separation of the filter from the holder during detachment of the holder from its support is very remote.

The provision of a large number of sockets, even if the number of male coupling elements is small, is desirable and advantageous because it is not necessary to invariably move the filter to a single angular position with reference to the holder 24 or 24' before the filter can enter the cupped member 25 or 25'.

An advantage of the retaining members 48 or analogous retaining means is that they ensure that the dregs of coffee beans in a filter which is coupled to its holder cannot adhere to the brewing unit when the holder is detached from its support. The dregs of coffee beans tend to accumulate into a cake which could adhere to the brewing unit in the absence of retaining means including the members 48 or the like. The cake becomes dry after a certain period of non-use of the apparatus (while the holder 24 or 24' remains attached to its support), and such dried cake exhibits a highly pronounced tendency to adhere to the brewing unit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In an apparatus for brewing expresso coffee, the combination of a support; a filter holder including a first cupped member having an open end; means for separably connecting said holder to said support; a filter arranged to receive a supply of comminuted coffee beans and receivable in said holder, said filter including a second cupped member fitting into said first cupped member and having an open end; and means for separably coupling said filter to said holder, said coupling means including complementary male and female coupling components, and said female coupling component being provided in the region of the open end of said first cupped member, said male coupling component being provided in the region of the open end of said second cupped member, and said male coupling component comprising a pair of male coupling elements disposed substantially diametrically opposite each other with reference to the axis of said second cupped member, said female coupling component having an annulus of sockets including several pairs of sockets disposed diametrically opposite each other with reference to the axis of said first cupped member, and said male coupling elements being removably receivable in any one of said pairs of sockets.

2. The combination of claim 1, wherein said first cupped member has an internal surface in the region of said open end thereof and said second cupped member has an external surface in the region of said open end thereof, said male coupling component being provided on said external surface and said female coupling component being provided in said internal surface.

3. The combination of claim 1, wherein said sockets are equidistant from each other, as considered in the circumferential direction of said first cupped member in the region of said open end thereof.

4. The combination of claim 1, wherein said filter further comprises means for retaining the supply of comminuted coffee beans in said second cupped member.

5. In an apparatus for brewing expresso coffee, the combination of a support; a filter holder including a first cupped member; means for separably connecting said holder to said support; a filter arranged to receive a supply of comminuted coffee beans and receivable in said holder, said filter including a second cupped member removably receivable in said first cupped member and arranged to confine said supply of comminuted coffee beans, and said filter further including means for retaining the supply of comminuted coffee beans in said second cupped member, said retaining means comprising at least one retaining member which extends into said second cupped member; and means for separably coupling said filter to said holder, said coupling means including complementary male and female coupling components one of which is provided on said holder and the other of which is provided on said filter.

6. The combination of claim 5, wherein said retaining means comprises a plurality of retaining members which extend into the interior of said second cupped member, said retaining members being equidistant from each other as considered in the circumferential direction of said second cupped member.

7. The combination of claim 6, wherein said retaining means comprises four retaining members.

8. The combination of claim 5, wherein said retaining means comprises at least one retaining member having at least one substantially hook-shaped retaining portion.

* * * * *